(12) United States Patent
Shibayama et al.

(10) Patent No.: US 8,045,160 B2
(45) Date of Patent: Oct. 25, 2011

(54) SPECTROSCOPY MODULE

(75) Inventors: Katsumi Shibayama, Hamamatsu (JP);
Takafumi Yokino, Hamamatsu (JP);
Tomofumi Suzuki, Hamamatsu (JP);
Helmut Teichmann, Zurich (CH);
Dietmar Hiller, Zurich (CH); Ulrich Starker, Zurich (CH)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 13/086,065

(22) Filed: Apr. 13, 2011

(65) Prior Publication Data
US 2011/0205538 A1    Aug. 25, 2011

Related U.S. Application Data

(63) Continuation of application No. 12/377,306, filed as application No. PCT/JP2008/060574 on Jun. 10, 2008, now Pat. No. 7,961,317.

(30) Foreign Application Priority Data

Mar. 4, 2008    (JP) ................................ P2008-053715

(51) Int. Cl.
*G01J 3/02* (2006.01)
*G01J 3/18* (2006.01)

(52) U.S. Cl. ..................................................... 356/328
(58) Field of Classification Search .................. 356/328
See application file for complete search history.

(56) References Cited

U.S. PATENT DOCUMENTS

2004/0239931 A1    12/2004    Teichmann et al.
2006/0139637 A1    6/2006    Cho et al.

FOREIGN PATENT DOCUMENTS

| JP | 4-294223 | 10/1992 |
| JP | 2004-354176 | 12/2004 |
| JP | 2005-172897 | 6/2005 |
| JP | 2005-308495 | 11/2005 |

*Primary Examiner* — F. L. Evans
(74) *Attorney, Agent, or Firm* — Drinker Biddle & Reath LLP

(57) ABSTRACT

Alignment marks 12a, 12b, 12c, and 12d are formed on the flat plane 11a of the peripheral edge portion 11 formed integrally with the diffracting layer 8, and when the lens portion 7 is mounted onto the substrate 2, these alignment marks 12a, 12b, 12c and 12d are positioned to the substrate 2, thereby making exact alignment of the diffracting layer 8 with respect to the light detecting portion 4a of the light detecting element 4, for example, not by depending on a difference in curvature radius of the lens portion 7. In particular, the alignment marks 12a, 12b, 12c and 12d are formed on the flat plane 11a, thereby image recognition is given to exactly detect positions of the alignment marks 12a, 12b, 12c and 12d, thus making it possible to make exact alignment.

4 Claims, 8 Drawing Sheets 12a,12b,12c,12d

Fig.7
(a)
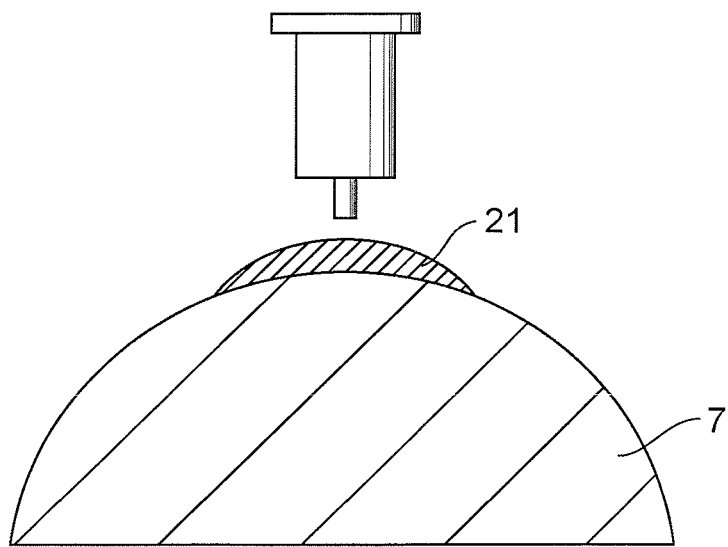
(b)
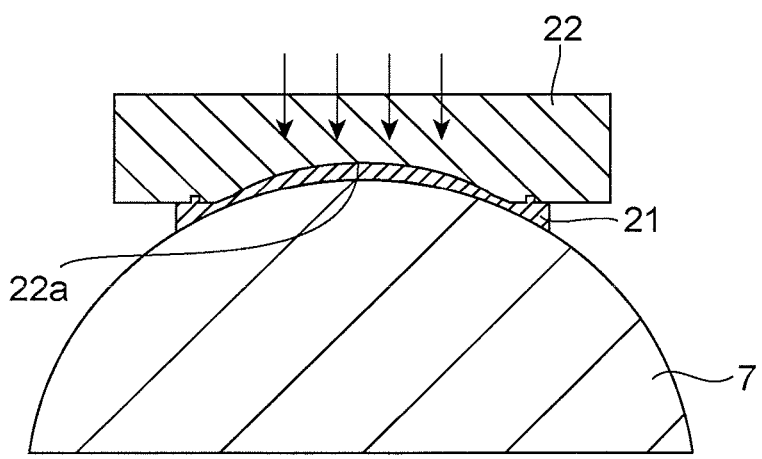
(c)
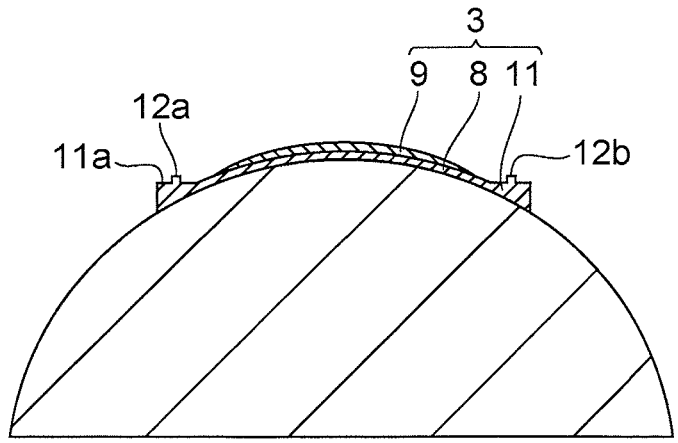

SPECTROSCOPY MODULE

This is a continuation application of application Ser. No. 12/377,306, having a §371 date of Feb. 12, 2009 now U.S. Pat. No. 7,961,317, which is a national stage filing based on PCT International Application No. PCT/JP2008/060574, filed on Jun. 10, 2008. The copending application Ser. No. 12/377,306 is incorporated by reference herein in its entirety.

TECHNICAL FIELD

The present invention relates to a spectroscopy module for dispersing light to detect the light.

BACKGROUND ART

There is known such a conventional spectroscopy module that is provided with a block-shaped supporting body, which is a double convex lens, a spectroscopic portion such as a diffraction grating on one convex plane of the supporting body, and a light detecting element such as a photodiode on the other convex plane of the supporting body (refer to Patent Document 1, for example). In the above-described spectroscopy module, light made incident from the other convex plane is dispersed at the spectroscopic portion and the thus dispersed light is detected by the light detecting element.
Patent Document 1: Japanese Published Unexamined Patent Application No. H04-294223

DISCLOSURE OF THE INVENTION

Problems to be Solved by the Invention

However, in the above-described spectroscopy module, where the spectroscopic portion and the light detecting element are attached to the supporting body, there may occur a deviation of the relative positional relationship between the spectroscopic portion and the light detecting element, thereby decreasing the reliability of the spectroscopy module.

Now, the present invention has been made in view of the above situation, an object of which is to provide a highly reliable spectroscopy module.

Means for Solving the Problems

In order to attain the above object, the spectroscopy module of the present invention is constituted with a substrate for transmitting light made incident from one plane, a lens portion which is formed on the other plane of the substrate to transmit light made incident into the substrate, a spectroscopic portion which is formed on the lens portion to disperse light made incident into the lens portion, and a light detecting element which is provided on the one plane to detect light dispersed by the spectroscopic portion, in which the spectroscopic portion is provided with a diffracting portion, a reflecting portion and an edge portion formed integrally with the diffracting portion, and a flat plane having an alignment mark is formed on the edge portion so as to be approximately in parallel at least with respect to one of the one plane and the other plane.

In the spectroscopy module, a lens portion at which a spectroscopic portion has been previously formed is mounted on a substrate with which a light detecting element has been previously aligned, thereby making alignment of a diffracting portion with respect to the light detecting element. However, alignment marks are formed on a flat plane of the edge portion formed integrally with the diffracting portion, and when the lens portion is mounted on the substrate, these alignment marks are positioned to the substrate or positioned directly to the light detecting element, thereby making exact alignment of the diffracting portion with respect to the light detecting element, for example, not depending on a difference in curvature radius of the lens portion. In particular, the alignment marks are formed on a flat plane approximately in parallel with a plane of the substrate, thereby image recognition is given to exactly detect positions of the alignment marks, thus making it possible to make exact alignment. Therefore, according to the spectroscopy module, it is possible to improve the reliability.

In the spectroscopy module of the present invention, it is preferable that the alignment marks are formed integrally with the diffracting portion. In this instance, there is improved a positional accuracy between the alignment marks and the diffracting portion, thus making it possible to make more exact alignment of the diffracting portion with the light detecting element.

In the spectroscopy module of the present invention, it is preferable that at least a pair of the alignment marks are formed along a groove arranged at the diffracting portion so as to hold the diffracting portion between them. In this instance, the alignment marks are positioned, thus making it possible to make exact alignment of the groove arranged at the diffracting portion. Thereby, light dispersed at the spectroscopic portion can be reliably guided to the light detecting element.

In the spectroscopy module of the present invention, it is preferable that the light detecting element is provided with a light passing hole through which light advancing into the spectroscopic portion passes. In this instance, a step at which the light detecting element is aligned with the light passing hole can be omitted on assembly, thus making it possible to easily conduct assembly work.

Effect of the Invention

According to the present invention, it is possible to improve the reliability.

BRIEF DESCRIPTION OF THE DRAWINGS

FIG. 7 is a view for explaining a production process for forming the spectroscopic portion at the lens portion.

DESCRIPTION OF REFERENCE NUMERALS

Figure 1:
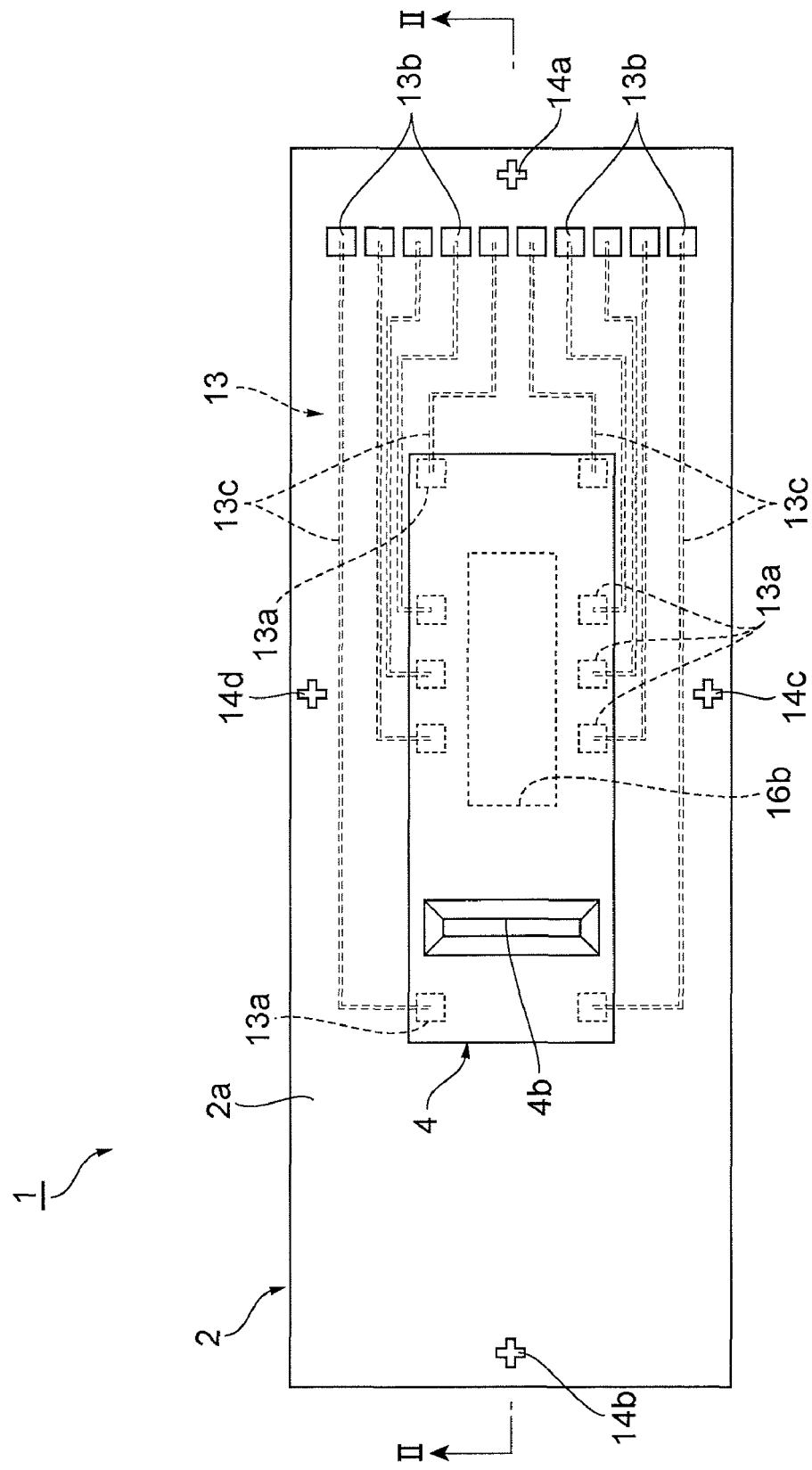
FIG. 1 is a plan view of a spectroscopy module of an embodiment of the present invention.

1: spectroscopy module
2: substrate
2a: front plane (one plane)
2b: rear plane (other plane)
3: spectroscopic portion
4: light detecting element 4b: light passing hole
7: lens portion
8: diffracting layer (diffracting portion)
11: peripheral edge portion (edge portion)
11a: flat plane
12a, 12b, 12c and 12d: alignment marks

BEST MODES FOR CARRYING OUT THE INVENTION

Hereinafter, a detailed description will be given to preferred embodiments of the present invention by referring to the drawings. It is noted that in the individual drawings, the same reference letters or numerals are given to the same and corresponding parts, with overlapping description omitted.

Figure 2:
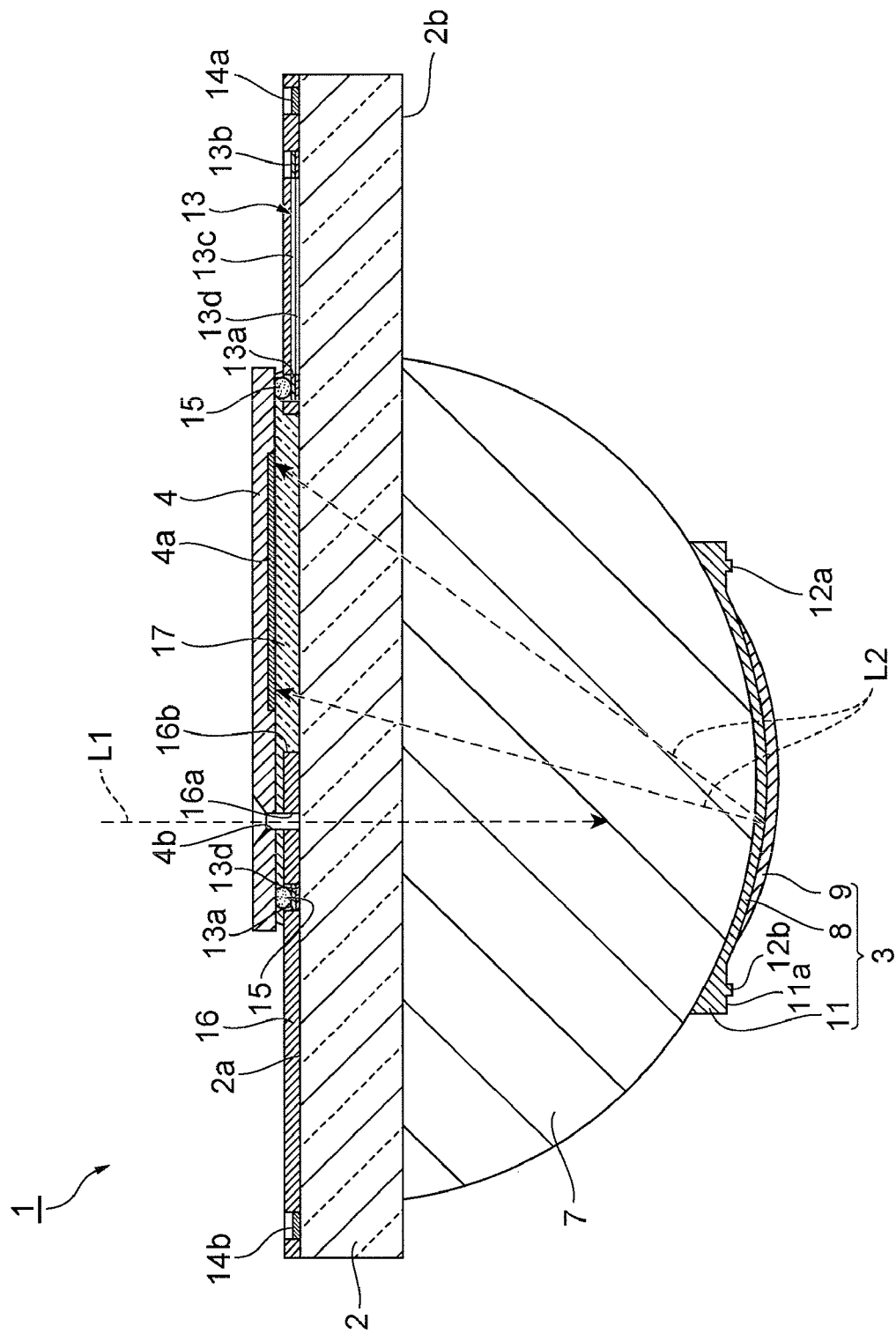
FIG. 2 is a cross sectional view of the spectroscopy module taken along line II to II given in FIG. 1.

As shown in FIG. 1 and FIG. 2, the spectroscopy module 1 is provided with a substrate 2 for transmitting light made incident from a front plane (one plane) 2a, a lens portion 7 which is formed on a rear plane (other plane) 2b of the substrate 2, a spectroscopic portion 3 which is formed on the lens portion 7 to disperse light L1 made incident into the lens portion 7, and a light detecting element 4 for detecting light L2 dispersed by the spectroscopic portion 3. The spectroscopy module 1 is to disperse the light L1 into a plurality of lights L2 by the spectroscopic portion 3 and detect the light L2 by the light detecting element 4, thereby measuring the wavelength distribution of the light L1 and the intensity of a specific wavelength component or the like.

The substrate 2 is formed in a rectangular plate shape by using light-transmitting glass or a light-transmitting resin such as BK7, Pyrex (registered trade mark), quartz, and the like.

Figure 3:
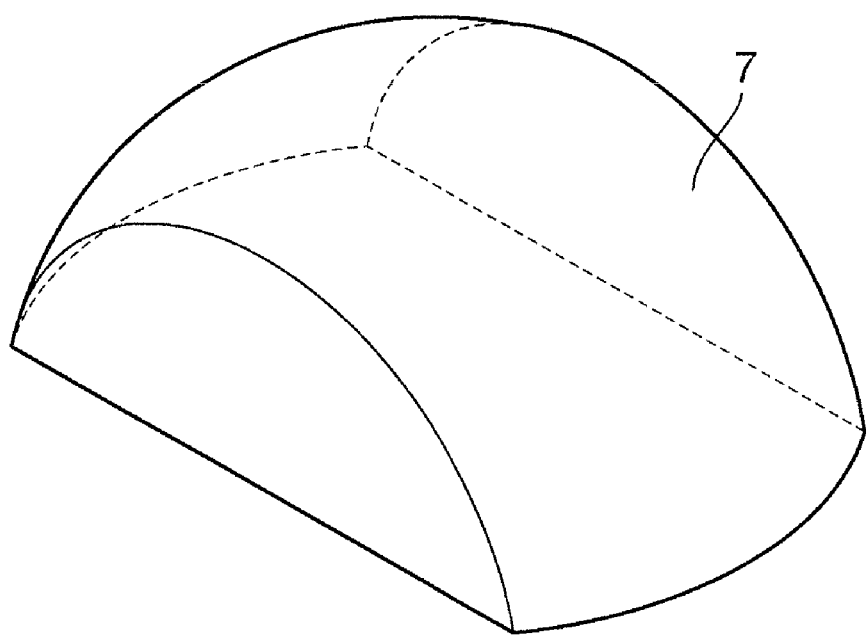
FIG. 3 is a perspective view showing a lens portion.

The lens portion 7 is formed by using the same material as that of the substrate 2, that is, a light-transmitting organic-inorganic hybrid material or light-transmitting low-melting temperature glass for replica molding, thereby acting as a lens for forming an image on a light detecting portion 4a of the light detecting element 4 on the basis of light L2 dispersed by the spectroscopic portion 3. The lens portion 7 is formed in such a shape that a hemispherical lens or a curved lens having lens effects is cut out by two flat planes approximately orthogonal to the flat plane portion thereof and approximately in parallel to each other to form side planes (refer to FIG. 3). The above-described shape is helpful in easily retaining the lens portion 7 on production and also downsizing the spectroscopy module 1. The lens portion 7 is arranged in such a manner that the side planes thereof are approximately in parallel with the longitudinal direction of the substrate 2 and bonded to the substrate 2 with an optical resin by direct bonding where it is made with the same material as that of the substrate 2.

The spectroscopic portion 3 is a reflection type grating having a diffracting layer (diffracting portion) 8 formed on the outer surface of the lens portion 7, a reflecting layer 9 formed on the outer surface of the diffracting layer 8 and a peripheral edge portion (edge portion) 11 formed at the periphery of the diffracting layer 8. The diffracting layer 8 is formed by installing a plurality of grooves together along the longitudinal direction of the substrate 2 (in the lateral direction on the space in FIG. 1 and FIG. 2), to which, for example, a serrated cross-sectional blazed grating, a rectangular cross-sectional binary grating, a sinusoidal cross-sectional holographic grating, or the like is applied. The grooves on the diffracting layer 8 are formed at a region indicated by G in FIG. 5 (refer to FIG. 5). The diffracting layer 8 is formed by using, for example, a photo-curing optical resin for replica molding such as a photo-curing epoxy resin, an acryl resin or an organic-inorganic hybrid resin. The reflecting layer 9 is in a film shape and formed by evaporating, for example, Al, Au or the like on the outer surface of the diffracting layer 8.

Figure 4:
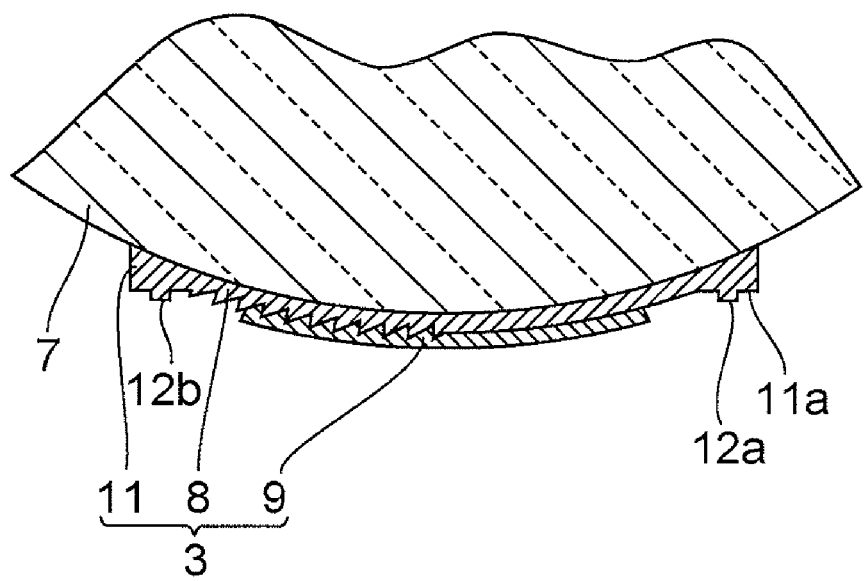
FIG. 4 is an enlarged cross sectional view showing the top of the lens portion and the spectroscopic portion.
Figure 5:
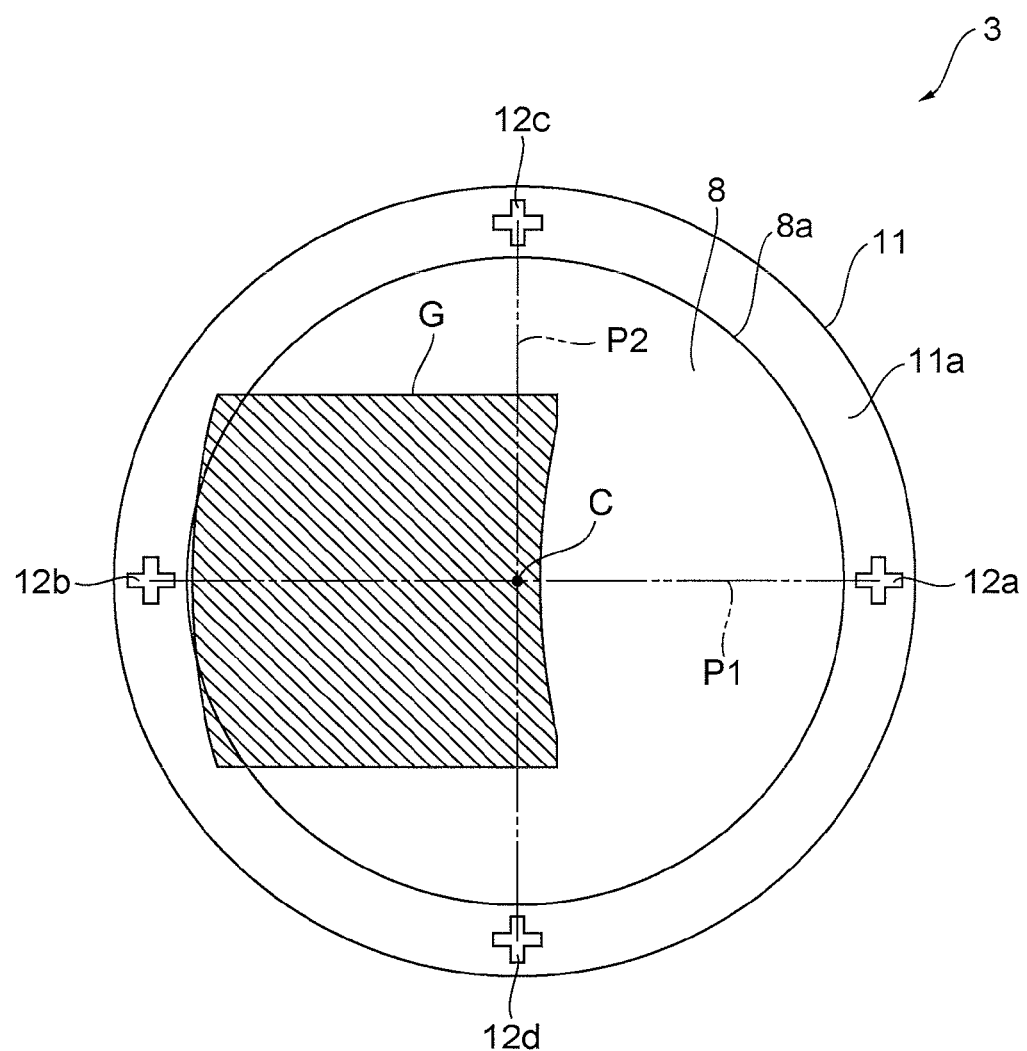
FIG. 5 is an enlarged view of the spectroscopic portion when viewed from the rear plane of a substrate.

As shown in FIG. 4 and FIG. 5, the peripheral edge portion 11 of the spectroscopic portion 3 is formed by using the same material as that of the diffracting layer 8 so as to enclose the periphery of the diffracting layer 8. A flat plane 11a approximately in parallel with the front plane 2a and the rear plane 2b of the substrate 2 is formed on the peripheral edge portion 11, and four alignment marks, 12a, 12b, 12c and 12d are formed on the flat plane 11a. The diffracting layer 8, the peripheral edge portion 11 and the alignment marks, 12a, 12b, 12c and 12d are formed integrally by one master grating (grating mold).

The alignment marks 12a, 12b are formed respectively along grooves arranged at the diffracting layer 8 so as to hold the diffracting layer 8 between them and also arranged so that a virtual line P1 connecting the alignment mark 12a and the alignment mark 12b passes through the center (C) of the diffracting layer 8. The alignment marks 12c, 12d are respectively formed along the grooves extending at the diffracting layer 8 so as to hold the diffracting layer 8 between them and arranged so that a virtual line P2 connecting the alignment mark 12c and the alignment mark 12d passes through the center (C) of the diffracting layer 8. As described so far, since a plurality of the alignment marks 12a, 12b, 12c and 12d are provided, other alignment marks can be used for positioning even if any of the alignment marks is found defective during production. Further, a periphery 8a of the diffracting layer 8 corresponds to an edge portion in master grating. Therefore, where the alignment marks are arranged at a position too close to the periphery 8a, the alignment marks may be difficult to form when molded. On the contrary, where the alignment marks are kept too far from the periphery 8a, it is necessary to make larger the peripheral edge portion 11. Thereby, the peripheral edge portion 11 is made thick, which may result in a difficulty in controlling a quantity of resin. Thus, it is preferable that the alignment marks 12a, 12b, 12c and 12d are formed in a range of 100 μm to 1000 μm away from the periphery 8a.

Figure 6:
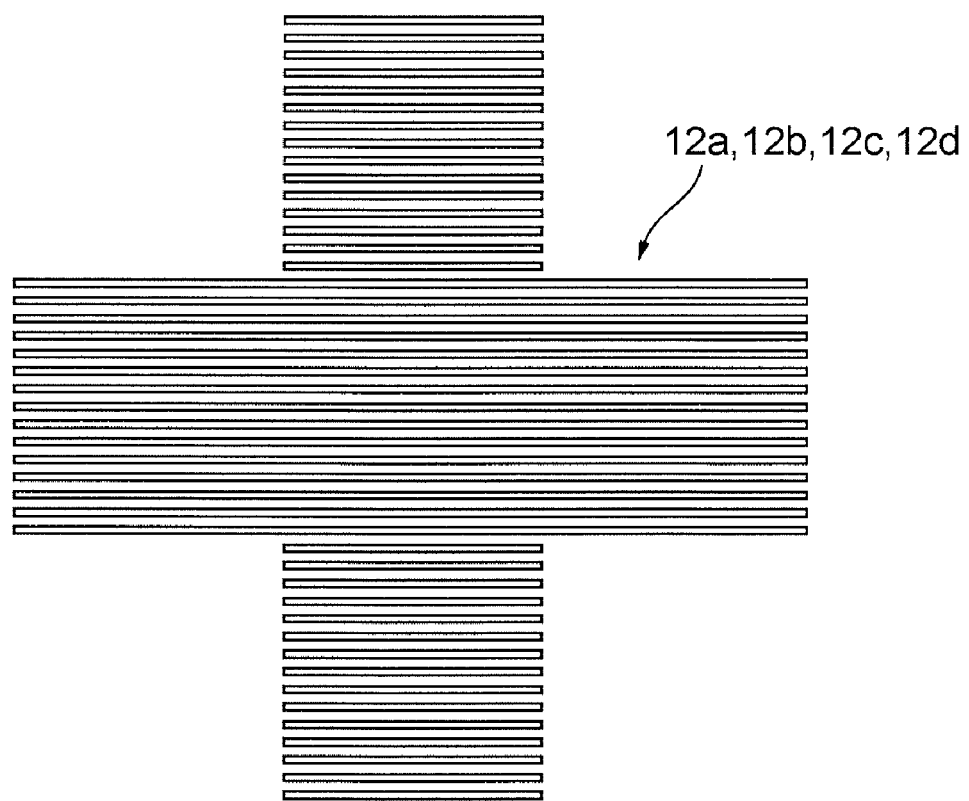
FIG. 6 is an enlarged view of alignment marks provided at a peripheral edge portion of the spectroscopic portion.

As shown in FIG. 6, the alignment marks 12a, 12b, 12c and 12d are formed in a cross shape by grating. Since molds of the diffracting layer and the alignment marks in master grating are formed by electron beam processing, all of them are etched shallowly. However, the alignment marks 12a, 12b, 12c and 12d are formed by grating, thus making it possible to improve the visibility of image recognition in positioning.

Reverting to FIG. 1 and FIG. 2, the light detecting element 4 is provided with a light detecting portion 4a in which long photodiodes are arrayed one-dimensionally in a direction approximately orthogonal to the longitudinal direction thereof to detect light L2 dispersed by the spectroscopic portion 3 and a light passing hole 4b which is installed together with the light detecting portion 4a in a direction at which the photodiodes are arrayed one dimensionally and through which light L1 advancing to the spectroscopic portion 3 passes. The light passing hole 4b is a slit extending in the width direction of the substrate 2 and formed by etching or the like in a state that it is positioned at a high accuracy with respect to the light detecting portion 4a. The light detecting element 4 is arranged in such a manner that a direction at which the photodiodes are arrayed one dimensionally is approximately in agreement with the longitudinal direction of the substrate 2 and also the light detecting portion 4a turns to the front plane 2a of the substrate 2. It is noted that the light detecting element 4 shall not be limited to the photodiode array but may include a C-MOS image sensor, a CCD image sensor or the like.

On the front plane 2a of the substrate 2, there is formed a wiring 13 made of a single film of Al, Au or the like or a laminated film of Cr—Pt—Au, Ti—Pt—Au, Ti—Ni—Au, Cr—Au or the like. The wiring 13 is provided with a plurality of pad portions 13a arranged at the center of the substrate 2, a plurality of pad portions 13b arranged at one end of the substrate 2 in the longitudinal direction and a plurality of connection portions 13c for connecting the corresponding pad portions 13a and the pad portions 13b. Further, the wiring 13 is provided on the front plane 2a of the substrate 2 with a light absorbing layer 13d made of a single film of CrO or the like or a laminated film of Cr—CrO or the like. Still further, alignment marks 14a, 14b, 14c and 14d are formed in a cross shape by using a laminated film similar to that of the wiring 13 on the front plane 2a of the substrate 2. The alignment marks 14a, 14b are formed respectively on both ends of the substrate 2 in the longitudinal direction and arranged at the center of the substrate 2 in the width direction. In addition, the alignment marks 14c, 14d are formed respectively at both ends of the substrate 2 in the width direction and arranged at the center of the substrate 2 in the longitudinal direction. These alignment marks 14a, 14b, 14c and 14d are respectively positioned to the alignment marks 12a, 12b, 12c and 12d in order to make alignment of the spectroscopic portion 3 with respect to substrate 2.

Further, a light absorbing film 16 is formed on the front plane 2a of the substrate 2 so as to expose the pad portions 13a, 13b of the wiring 13 and the alignment marks 14a, 14b, 14c and 14d and also cover the connection portions 13c of the wiring 13. On the light absorbing film 16, there are formed a slit 16a at a position opposing the light passing hole 4b of the light detecting element 4 so that light L1 advancing into the spectroscopic portion 3 passes and an opening portion 16b at a position opposing the light detecting portion 4a so that light L2 advancing into the light detecting portion 4a of the light detecting element 4 passes. The light absorbing film 16 is subjected to a predetermined-shaped patterning and formed integrally by using CrO, a CrO-containing laminated film, black resist or the like.

An external terminal of the light detecting element 4 is electrically connected by face-down bonding via a bump 15 to the pad portions 13a exposed from the light absorbing film 16. Further, the pad portions 13b are electrically connected to an external electrical element (not illustrated). Then, an underfill material 17 for transmitting at least light L2 is filled in the substrate 2 side of the light detecting element 4 (in this instance, between the light detecting element 4 and the substrate 2 or the light absorbing film 16), thus making it possible to retain mechanical strength.

A description will be given to a method for producing the above-described spectroscopy module 1.

The wiring 13 and the alignment marks 14a, 14b, 14c and 14d are at first subjected to patterning on the front plane 2a of the substrate 2. Thereafter, the pad portions 13a, 13b and the alignment marks 14a, 14b, 14c and 14d are exposed, and the light absorbing film 16 is subjected to patterning so that the slit 16a and the opening portion 16b are formed. The light absorbing film 16 is formed by being aligned by photo lithography. After formation of the light absorbing film 16, exact alignment is made to mount the light detecting element 4 thereon by face-down bonding at a high accuracy.

Then, the spectroscopic portion 3 is formed at the lens portion 7. A description will be given to a process of forming the spectroscopic portion 3 by referring to FIG. 7. As shown in FIG. 7(a), an optical resin for replica molding 21 for forming the diffracting layer 8, the peripheral edge portion 11 and the alignment marks 12a, 12b, 12c and 12d are dropped in the vicinity of the top of the lens portion 7. As shown in FIG. 7(b), a light-transmitting master grating 22 made of quartz or the like is allowed to be in contact with the thus dropped optical resin for replica molding 21. In the master grating 22, a grating corresponding to the diffracting layer 8 is engraved in the vicinity of the recessed portion 22a having approximately the same curvature radius as that of the lens portion 7, and a shape corresponding to the alignment marks 12a, 12b, 12c, 12d is also formed on the periphery of the recessed portion 22a by grating. Light is shed to effect curing in a state that the master grating 22 is in contact with the optical resin for replica molding 21, by which the diffracting layer 8, the peripheral edge portion 11 and the alignment marks 12a, 12b, 12c and 12d are formed integrally. It is preferable that they are stabilized by being heated and cured after the curing. After the optical resin for replica molding 21 is cured, the master grating 22 is released from the mold. Then, as shown in FIG. 7(c), aluminum or gold is evaporated on the outer plane of the diffracting layer 8, thereby forming the reflecting layer 9.

Figure 8:
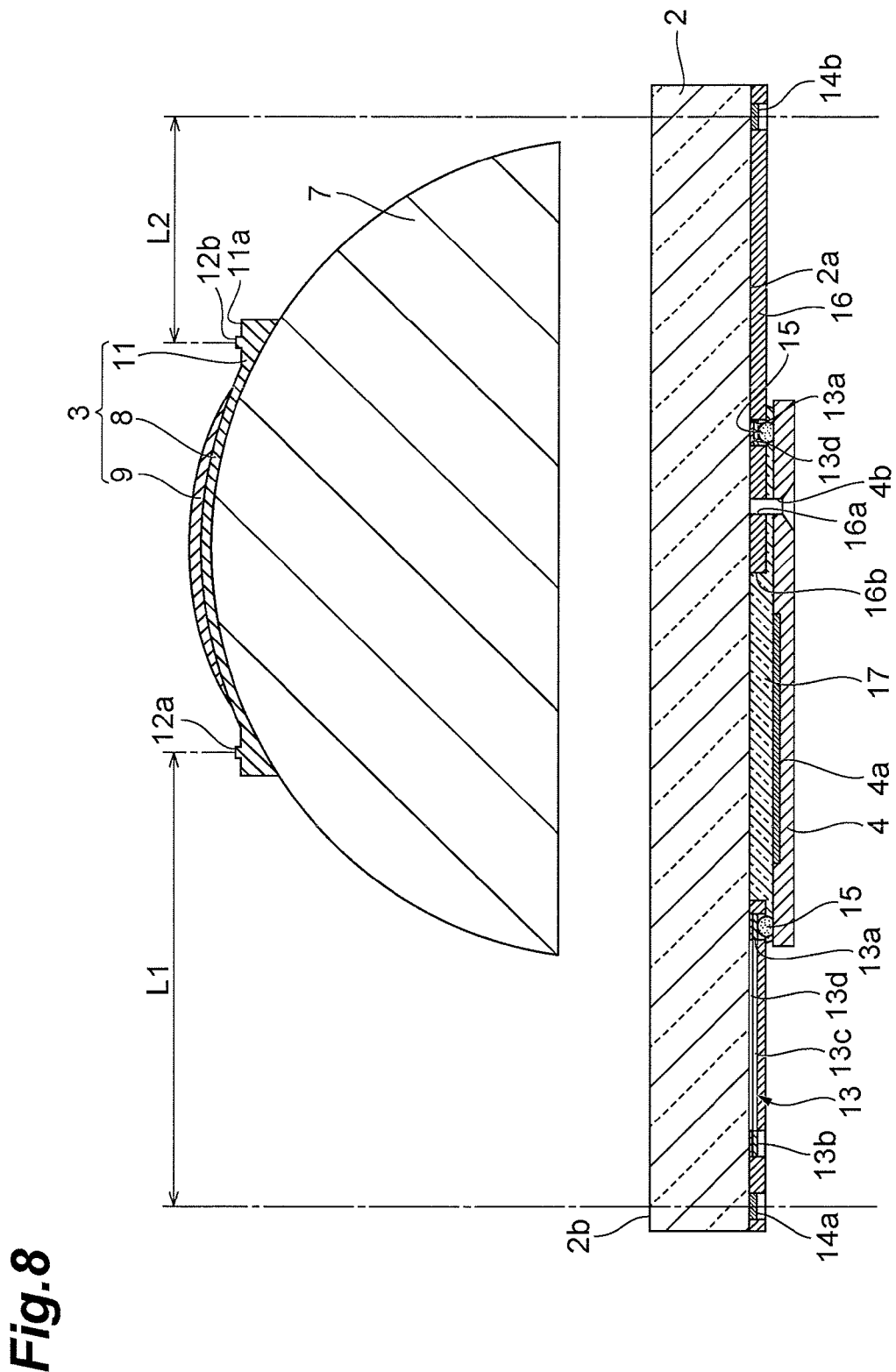
FIG. 8 is a view for explaining a process for mounting the lens portion on the substrate.

After the spectroscopic portion 3 is formed at the lens portion 7 by the above process, as shown in FIG. 8, the substrate 2 is arranged at a mounting device (not illustrated) so that the light detecting element 4 turns downward, and a light-curing optical resin is coated on the rear plane 2b of the substrate 2. Then, while image recognition is given so that the alignment marks 12a, 12b, 12c and 12d are positioned respectively to the alignment marks 14a, 14b, 14c and 14d, the lens portion 7 is jointed to the rear plane 2b of the substrate 2, light is radiated to effect resin adhesion, thereby the lens portion 7 is mounted on the substrate 2. It is noted that the alignment marks 12a, 12b, 12c and 12d and the respectively corresponding alignment marks 14a, 14b, 14c and 14d are not necessarily at the same address. For example, in FIG. 8, the alignment mark 12a is offset with respect to the alignment mark 14a only by L1, and the alignment mark 12b is offset with respect to the alignment mark 14b only by L2.

A description will be made for the working effect of the above-described spectroscopy module 1.

In the spectroscopy module 1, the lens portion 7 at which the spectroscopic portion 3 has been previously formed is mounted on the substrate 2 to which the light detecting element 4 has been previously aligned and mounted, by which the light detecting element 4 is aligned with the diffracting layer 8. Alignment marks 12a, 12b, 12c and 12d are formed on the flat plane 11a of the peripheral edge portion 11 formed integrally with the diffracting layer 8. Thus, when the lens portion 7 is mounted on the substrate 2, these alignment marks 12a, 12b, 12c and 12d are positioned to the substrate 2, thereby making exact alignment of the diffracting layer 8 with respect to the light detecting portion 4a of the light detecting element 4, for example, not by depending on a difference in curvature radius of the lens portion 7. In particular, the alignment marks 12a, 12b, 12c and 12d are formed on the flat plane 11a approximately in parallel with the front plane 2a and the rear plane 2b of the substrate 2, thereby image recognition is given to exactly detect the positions of the alignment marks 12a, 12b, 12c and 12d, thus making it possible to make exact alignment. Therefore, according to the spectroscopy module 1, it is possible to improve the reliability.

Further, since the alignment marks 12a, 12b, 12c and 12d are formed integrally with the diffracting layer 8, it is possible to improve the positional accuracy of the alignment marks 12a, 12b, 12c and 12d with respect to the diffracting layer 8. Thereby, it is possible to make more exact alignment of the diffracting layer 8 with respect to the light detecting portion 4a of the light detecting element 4.

Still further, a pair of the alignment marks 12a, 12b are formed along a groove arranged at the diffracting layer 8 so as to hold the diffracting layer 8 between them. Therefore, alignment marks 12a, 12b are positioned, by which the groove arranged at the diffracting layer 8 can also be positioned exactly. As a result, light dispersed by the spectroscopic portion 3 can be reliably guided to the light detecting portion 4a of the light detecting element 4.

In addition, the light detecting element 4 is provided with a light passing hole 4b through which light advancing into the spectroscopic portion 3 passes. Therefore, a step of making alignment of the light passing hole with respect to the light detecting portion 4a of light detecting element 4 can be omitted on assembly, thus making it possible to conduct assembly work easily.

The present invention shall not be limited to the above-described embodiment.

For example, in the present embodiment, although the alignment marks 12a, 12b, 12c and 12d are positioned to the alignment marks 14a, 14b, 14c and 14d formed on the substrate 2, they may be positioned to an outer shape of the substrate 2 or alignment marks formed on the light absorbing film 16 of the substrate 2. Further, they may be positioned not via the substrate 2 but directly to the alignment marks provided on the light detecting element 4 or the outer shape of the light detecting element 4.

Further, in the present embodiment, the light absorbing film 16 is provided on the substrate 2. Instead, a light protection layer may be provided.

Still further, in the present embodiment, the light passing hole 4b is provided at the light detecting element 4. Instead, a light detecting element free of a light passing hole is applied, by which light L1 may be allowed to pass directly through the slit 16a of the light absorbing film 16.

INDUSTRIAL APPLICABILITY

According to the present invention, it is possible to improve the reliability.

The invention claimed is:

1. A spectroscopy module comprising: a substrate for transmitting light made incident from a front plane;
   a light-transmitting member which is formed on a rear plane of the substrate to transmit light made incident into the substrate;
   a spectroscopic portion which is formed on the light-transmitting member to disperse light made incident into the light-transmitting member; and
   a light detecting element which is provided on the front plane to detect light dispersed by the spectroscopic portion;
   wherein the spectroscopic portion is provided with a light-transmitting layer and a reflecting layer,
   and a diffracting portion and an alignment mark are formed on the light-transmitting layer.

2. The spectroscopy module as set forth in claim 1, wherein the alignment mark is formed integrally with the diffracting portion.

3. The spectroscopy module as set forth in claim 1, wherein at least a pair of the alignment marks are formed along a groove arranged at the diffracting portion so as to hold the diffracting portion between them.

4. The spectroscopy module as set forth in claim 1, wherein the light detecting element is provided with a light-passing hole through which light advancing into the spectroscopic portion passes.

\* \* \* \* \*